Nov. 13, 1945.  A. BRILHART  2,388,822
REED FOR MUSICAL INSTRUMENTS
Filed March 13, 1943
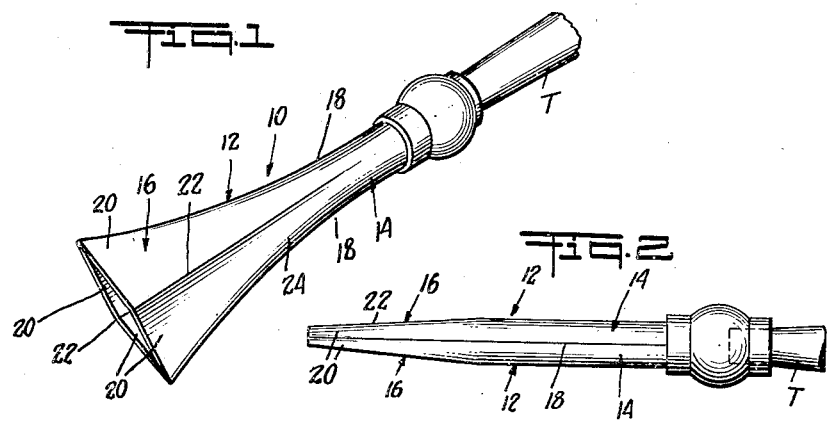
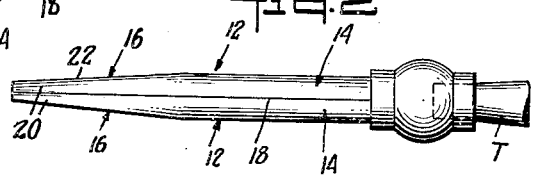
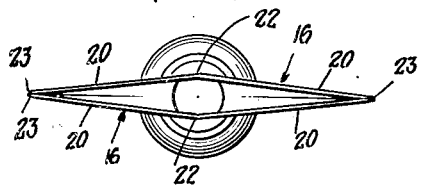
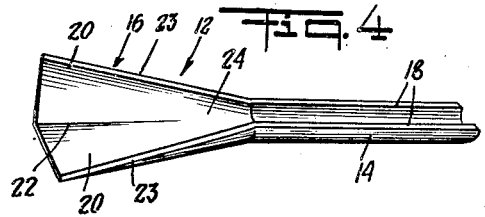
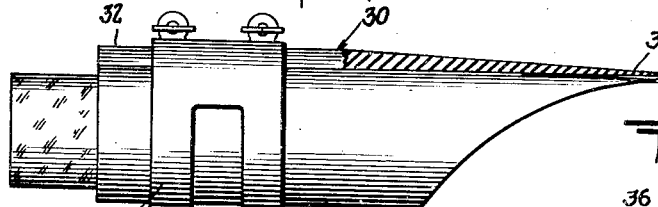
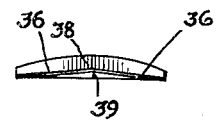
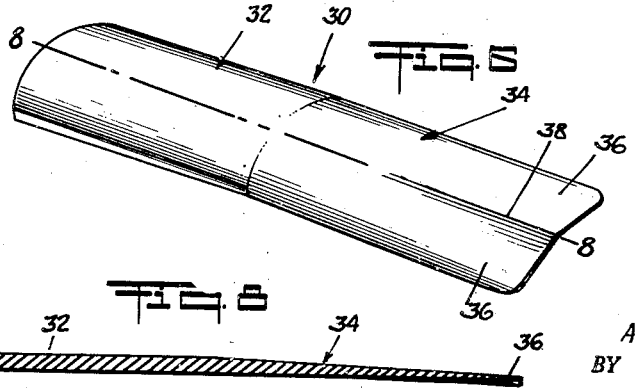
INVENTOR.
ARNOLD BRILHART
BY
ATTORNEY Patented Nov. 13, 1945

2,388,822

UNITED STATES PATENT OFFICE 2,388,822

REED FOR MUSICAL INSTRUMENTS

Arnold Brilhart, Great Neck, N. Y., assignor to Arnold Brilhart Ltd., a corporation of New York Application March 13, 1943, Serial No. 479,017

10 Claims. (Cl. 84—383)

This invention relates to reeds for musical instruments and more particularly to reeds of the double reed type, for example, reeds for bassoons, oboes, and English horns, as well as to reeds for saxophones, clarinets and flutes.

The primary object of the present invention is the provision of reeds which are so constructed, especially in the vibratory tongue portions thereof, as to resist the complete closure of the air passage between the confronting parts of the double reed or between the confronting surfaces of the tongue portion of the single reed and the mouthpiece which is apt to occur with reeds as heretofore constructed when the higher notes are being played.

The above object of the invention and other objects ancillary thereto will be best understood from the following description, reference being had to the accompanying illustrative drawing.

In the drawing:

Fig. 1 is a perspective view of a double reed embodying the present invention;

Fig. 2 is a side view thereof;

Fig. 3 is a front end view thereof;

Fig. 4 is a perspective view of one of the parts of the double reed;

Fig. 5 is a side view in elevation of the mouthpiece of a clarinet having a reed of the present invention applied thereto, said reed being shown partly in section;

Fig. 6 is a perspective view of the reed shown in Fig. 5;

Fig. 7 is a view in elevation of the forward end of the reed illustrated in Fig. 6;

Fig. 8 is a longitudinal sectional view of the reed on the line 8—8 of Fig. 6.

Referring now to the drawing in detail, and first to the double reed 10 illustrated in Figs. 1 to 4, said reed is formed of two reed members 12 of identical construction, one of said reed members being illustrated in Fig. 4. Said reed members 12 are molded by any suitable molding operation from a suitable plastic, for example, "Lucite," "Vinylite," Celluloid, "Bakelite," cellulose acetate, etc., and comprises a semi-cylindrical tubular part 14 and a vibratile tongue part 16. When the two reed members 12 are combined to form the double reed 10 illustrated in Figs. 1 to 3, said double reed comprises a molded plastic body having a tubular part defined by the parts 14 of the companion members 12 and a vibratile tongue formed by the tongue portions 16 of said companion reed members. In the double reed 10, the companion members 12 are secured to each other along the adjacent side edges 18 of the two members, from the rear end of the double reed into which the tube T of the musical instrument is fitted substantially, to the forward end of said tubular part, that is at the point at which the laterally flaring tongue portions 16 merge into the tubular part. Edges 18 of the companion tubular parts may be joined to each other in any suitable way, depending upon the nature of the plastic material used in forming the reed members, for example, by fusing said edges to each other by heat or by a solvent, when the nature of the plastic permits of this, or by joining said edges by any suitable adhesive or adhesive-forming substance applied to said edges. It will be understood that the vibratile tongue portions 16 of the reed are free from direct securement to each other, and that they can vibrate and move relatively to each other.

As clearly shown in the drawing, the vibratile tongue portion 16 of each reed member 12 is constituted by the lateral portions 20 which are flat inclined toward each other transversely of the reed toward the outer surface thereof to the median line 22. Said companion flat portions 20 of each member 12 gradually merge longitudinally of the reed into the curved portion 24 forwardly of the tubular part 14. It will be noted that the inner surfaces of parts 20 of each member 20 are thus inclined toward each other transversely of the reed from the opposite side edges 23 of part 16 to the intermediate or median line 22, in a direction toward the outer surface of part 16, and that said inner surfaces of the companion portions 20 define a recess therebetween. By reason of the construction of the vibratile tongue parts 16 with the flat inclined portions 20 which meet at the median line 22 in integral relation, the vibratile tongue of the double reed constituted by parts 16 resists the complete closure of the air passage between the opposed surfaces of the vibratile tongues 16 of the two reed members, which is apt to occur with reeds as heretofore constructed when the higher notes are being played.

In Figs. 5 to 8, there is illustrated a single reed embodying the above described feature of the double reed. The single reed 30 here shown may be formed, preferably by molding the same, from any suitable material, such, for example, as those mentioned above in the description of the double reed 10. As here shown reed 30 comprises a rear part 32 which is seated on the lay of the mouthpiece of the musical instrument on which it is removably held by the ligature L. Said reed comprises also, as usual, a longitudinally extending tapering part 34 provided with the vibratile tongue of the reed which terminates in a thin forward marginal portion constituted as here shown by the inclined flat portions 36 which meet in integral relation at the median line 38. It will be noted that the inner surfaces of parts 36 are inclined toward each other transversely of the reed and toward the outer surface thereof, so that a recess is formed between said inner surfaces as indicated at 39 in Fig. 7. It will be understood that said portions 36 of the vibratile tongue of reed 34 resist the tendency of the musician to press the vibratile tongue portion against the adjacent portions of the forward tip of the mouthpiece and thus tend to prevent the complete closure of the air passage at the forward tip of the mouthpiece. The reed 30 has the usual transversely curved upper surface and the usual flat inner surface, except at the forward inclined parts 36 which, however, gradually merge into said curved and flat surfaces at the opposite sides, respectively, of the reed.

Thus it is seen that the reeds constructed herein as shown and illustrated are well adapted to accomplish the purpose of the present invention. It will be understood, however, that I do not wish to be limited precisely to the reconstruction herein shown or described except to the extent which may be required by the scope of the appended claims.

Having thus described my invention, what I claim and desire to secure by Letters Patent is:

1. A reed for the mouthpiece of a musical instrument, said reed comprising a vibratile tongue part provided with lateral portions which are inclined toward each other transversely of said tongue part whereby the inner surfaces of said lateral portions define a recess therebetween.

2. A reed for the mouthpiece of a musical instrument, said reed comprising a vibratile tongue part provided with lateral portions having inner surfaces which are inclined toward each other transversely of said tongue in directions toward the outer surface of said tongue part.

3. A double reed for a musical instrument of the double reed type, said reed comprising a body having a tubular part and a forward vibratile tongue composed of opposed relatively movable vibratile portions defining an opening leading to the interior of said tubular part, the inner surface of at least one of said vibratile portions being defined by surface portions which are inclined toward each other transversely of said tongue in a direction away from the confronting inner surface portions of the opposed vibratile tongue portion.

4. A double reed for a musical instrument of the double reed type, said reed comprising a molded-plastic body having a hollow tubular part and a forward vibratile tongue composed of opposed relatively movable vibratile portions defining an opening leading to the interior of said tubular part, the inner surface of at least one of said vibratile portions being defined by surface portions which are inclined toward each other transversely of said tongue in a direction away from the confronting inner surface portions of the opposed vibratile tongue portion.

5. A double reed for a musical instrument of the double reed type, said reed comprising a body having a tubular part and a forward vibratile tongue composed of opposed relatively movable vibratile portions defining an opening leading to the interior of said tubular part, the inner surface of each of said vibratile portions at the forward ends thereof being defined by surface portions which are inclined toward each other transversely of said tongue in a direction away from the confronting inner surface portions of the opposed vibratile tongue portion.

6. A double reed for a musical instrument of the double reed type, said reed comprising a molded-plastic body having a hollow tubular part and a forward vibratile tongue composed of opposed relatively movable vibratile portions defining an opening leading to the interior of asid tubular part, the inner surface of each of said vibratile portions at the forward ends thereof being defined by surface portions which are inclined toward each other transversely of said tongue in a direction away from the confronting inner surface portions of the opposed vibratile tongue portion.

7. A reed for the mouthpiece of a musical instrument, comprising a member having a rear part adapted to seat on the lay of the mouthpiece and a longitudinal tapering part extending forwardly from said rear part and providing a vibratile tongue part, said vibratile tongue part having lateral portions, the inner surfaces of which are inclined toward each other transversely of said tongue in directions toward the outer surface of said tongue.

8. A reed for the mouthpiece of a musical instrument, comprising a member having a rear part adapted to seat on the lay of the mouthpiece and a longitudinal tapering part extending forwardly from said rear part and providing a vibratile tongue part, said vibratile tongue part having lateral portions, which are inclined toward each other transversely of said tongue part whereby the inner surfaces of said lateral portions define a recess therebetween.

9. A reed for the mouthpiece of a musical instrument, said reed having a vibratile tongue having lateral parts which extend from the opposite side edges, respectively, of the tongue and are inclined toward the outer surface in directions extending from said opposite edges, respectively, to a line running longitudinally of the reed intermediate said edges thereof.

10. A double reed for a musical instrument of the double reed type, said reed comprising a body having a tubular part and a forward vibratile tongue composed of opposed relatively movable vibratile portions defining an opening leading to the interior of said tubular part, each of said vibratile tongue portions having lateral parts which extend from the opposite side edges, respectively, of the tongue and are inclined toward the outer surface in directions extending from said opposite sides, respectively, to a line running longitudinally of the reed intermediate said edges thereof.

ARNOLD BRILHART.